United States Patent Office 2,945,056
Patented July 12, 1960

2,945,056

SALTS OF SULFO-LOWER-ALKYL ESTERS OF CHLOROARYLOXY - LOWER - ALIPHATIC-MONOCARBOXYLIC ACIDS

Lee H. Horsley and Arthur R. Sexton, Midland, Mich., assignors to The Dow Chemical Company, Midland, Mich., a corporation of Delaware No Drawing. Filed Aug. 2, 1956, Ser. No. 601,646

2 Claims. (Cl. 260—473)

This invention is directed to the alkali metal, alkaline earth metal, ammonium and lower alkyl amine salts of the sulfo-lower-alkyl esters of the chloroaryloxy-lower-aliphatic-monocarboxylic acids. These novel compounds may be characterized by the following formula

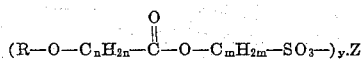

In this and succeeding formulas, R represents a chloroaryl radical, Z represents a salt forming group selected from the alkali metal, alkaline earth metal, ammonium and lower alkyl ammonium ions, $n$ is an integer from 1 to 3, inclusive, $m$ is an integer from 2 to 4, inclusive and $y$ represents the valence of the salt forming ion. The term "lower alkyl" refers to the alkyl radicals containing from 1 to 4 carbon atoms, inclusive. These new compounds are viscous liquids or crystalline solids possessing both hydrophilic and hydrophobic properties. They are useful as surface active agents and have been found to be active as plant growth control materials and soil sterilants. They are adapted to be employed as active toxic constituents in dust and liquid compositions for the control of the growth and killing of weeds and for the sterilization of soil with regard to the growth of plants. The compounds are also useful as parasiticides for the control of many bacterial organisms such as *Salmonella typhosa* and *Aspergillus terreus*.

The new compounds may be prepared by reacting a hydroxyalkanesulfonic acid salt having the formula

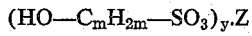

with a chloroaryloxy-lower-aliphatic-monocarboxylic acid chloride having the formula

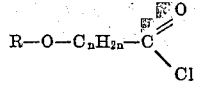

The reaction takes place smoothly at temperatures of from 100° to 160° C. with the formation of the desired product and hydrogen chloride of reaction. Good results are obtained when employing one molecular proportion of the acid chloride with substantially 0.5 molecular proportion of the alkaline earth metal salts of the hydroxyalkanesulfonic acids, and substantially one molecular proportion of the alkali metal, ammonium and lower alkyl amine salts of the hydroxyalkanesulfonic acids, i.e. when employing substantially stoichiometric proportions of the reactants. The reaction may be carried out in an inert organic solvent and under somewhat reduced pressure to remove the hydrogen chloride of reaction as formed.

In carrying out the reaction, the hydroxy alkanesulfonic acid salt and acid chloride are mixed together and heated at a temperature of from 110° to 150° C. until the evolution of hydrogen chloride of reaction is substantially complete. In an alternative procedure, the reactants may be dispersed in a solvent such as chlorobenzene and the resulting mixture heated at the boiling point and under reflux. During the reaction a gaseous entraining agent may be bubbled through the reaction mixture to facilitate the removal and collection of hydrogen chloride by-product. Upon completion of the reaction as is evidenced by the cessation of hydrogen chloride evolution, any solvent may be removed from the reaction mixture by partial distillation under reduced pressure to obtain the desired product as a liquid or solid residue.

The following examples illustrate the invention but are not to be construed as limiting:

*Example 1.—Sodium salt of the 2-sulfoethyl ester of 2,4-dichlorophenoxyacetic acid*

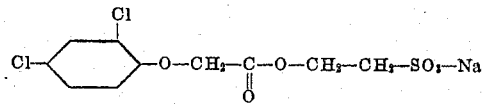

A quantity of sodium 2-hydroxyethanesulfonate was prepared by adding ethylene oxide portionwise with stirring to an aqueous solution of sodium bisulfite at a temperature of from 50° to 100° C. The desired product was obtained as a white solid melting at 192.8° to 193.3° C. and containing 21.4 percent sulfur compared to the calculated value of 21.6 percent.

One mole (148 grams) of the above prepared sodium 2-hydroxyethanesulfonate and one mole (239.5 grams) of 2,4-dichlorophenoxyacetyl chloride were mixed and placed in a steam jacketed blender and heated with stirring by the application of 15 pounds of steam (120° C.) to the blender jacket. After seven minutes of heating a vigorous reaction took place with the evolution of hydrogen chloride of reaction. Heating was therafter continued for 30 minutes at the same temperature while nitrogen was bubbled through the mixture to facilitate the removal of hydrogen chloride as formed. The reaction mixture was then placed under a reduced pressure of 35 millimeters and heated for an additional 1.5 hours at the same temperature. The blender and contents were then cooled to room temperature. As a result of these operations there was obtained as a white powder a sodium salt of the 2-sulfoethyl ester of 2,4-dichlorophenoxyacetic acid. This salt decomposed at 265° C. and had a chlorine content of 19.76 percent compared to the theoretical content of 20.2 percent.

*Example 2.—Sodium salt of the 2-sulfoethyl ester of 2,4,5-trichlorophenoxyacetic acid*

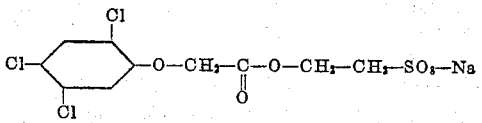

A mixture of 2 moles (296 grams) of sodium 2-hydroxy-ethanesulfonate as prepared in Example 1 and 2 moles (548 grams) of 2,4,5-trichlorophenoxyacetyl chloride was placed in a steam jacketed blender and heated at 15 pounds of steam (120° C.). A vigorous reaction took place in about 7 minutes with the evolution of hydrogen chloride. Heating was thereafter continued at the same temperature for 30 minutes while nitrogen was bubbled through the reaction mixture to facilitate the removal of hydrogen chloride. The mixture was then placed under a reduced pressure of 35 millimeters and heated for 1.25 hours at the same temperature to insure completion of the reaction. As a result of these operations, a sodium salt of the 2-sulfoethyl ester of 2,4,5-trichlorophenoxy-acetic acid was obtained as a white solid. This product had a saponification number of 145.7 and a chlorine content of 26.8 percent compared to the theoretical values of 145.5 and 27.6 percent.

Example 3.—Sodium salt of the sulfoproyl ester of 2,4-dichlorophenoxyacetic acid

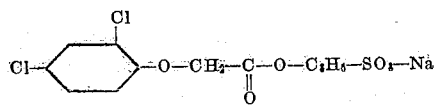

A quantity of sodium hydroxypropanesulfonate was prepared by the reaction of sodium bisulfite with propylene oxide at a temperature of from 54° to 100° C. This sulfonate product was a white solid melting at 224°–226° C. and contained 19.5 percent sulfur compared to the theoretical value of 19.75 percent.

Two moles (324 grams) of the above prepared sodium hydroxypropanesulfonate and two moles (480 grams) of 2,4-dichlorophenoxyacetyl chloride were placed in a steam jacketed blender and reacted at 15 pounds of steam in the same manner as described in Example 1. Upon completion of the reaction, there was obtained a sodium salt of the sulfopropyl ester of 2,4-dichlorophenoxyacetic acid as a white solid which melted at 174°–176° C. and contained 19.69 percent chlorine compared to the theoretical content of 19.5 percent chlorine.

Example 4.—Sodium salt of the sulfopropyl ester of 2,4,5-trichlorophenoxyacetic acid Two moles (548 grams) of 2,4,5-trichlorophenoxyacetyl chloride and two moles (324 grams) of the sodium hydroxypropanesulfonate product as prepared in Example 3 were reacted in a steam jacketed blender at 15 pounds of steam as described in Example 1. Upon completion of the reaction, there was obtained the sodium salt of the sulfopropyl ester of 2,4,5-trichlorophenoxyacetic acid. This salt had a melting point of 193°–196° C. and a chlorine content of 26.1 percent compared to the calculated chlorine content of 26.12 percent.

Example 5.—Sodium salt of the 2-sulfoethyl ester of 2-methyl-4-chlorophenoxyacetic acid

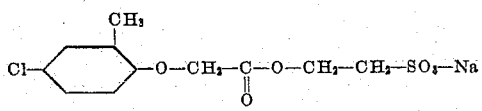

162 grams (1.1 moles) of the sodium hydroxyethanesulfonate product prepared in Example 1 and 224 grams (1.02 moles) of 2-methyl-4-chlorophenoxyacetyl chloride were heated at 150° C. in a steam jacketed blender for one hour at 200 millimeters' pressure. Upon cooling the blender, there was obtained the sodium salt of the 2-sufoethyl ester of 2-methyl-4-chlorophenoxyacetic acid as a yellow solid. This solid product was recrystallized from ethanol and was found to melt at 210° C. and contain 10.6 percent chlorine compared to the theoretical chlorine content of 10.8 percent.

Example 6.—Sodium salt of the 2-sulfoethyl ester of 3,4-dichlorophenoxyacetic acid

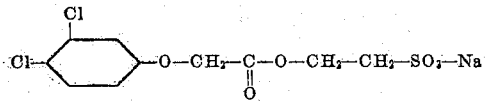

A portion of the sodium hydroxyethanesulfonate product previously prepared (44.4 grams; 0.3 mole) and 72 grams (0.3 mole) of 3,4-dichlorophenoxyacetyl chloride were dissolved in 200 milliliters of chlorobenzene. The resulting mixture was heated at the boiling temperature (130° C.) and under reflux while bubbling nitrogen through the mixture to facilitate the removal and collection of hydrogen chloride as formed. When the evolution of hydrogen chloride was substantially complete, the solvent was removed by evaporation to obtain the desired product as a crystalline solid. This product was recrystallized from ethanol and melted at 218°–220° C.

Example 7.—Sodium salt of the sulfobutyl ester of α-(2,4-dichlorophenoxy)propionic acid

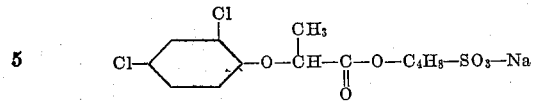

A quantity of sodium hydroxybutanesulfonate was prepared by adding 80 grams of a mixture containing 92 percent 1,2-epoxybutane and 8 percent 2,3-epoxybutane to an aqueous solution containing 104 grams of sodium bisulfite at a temperature of from 50° to 100° C. This sulfonate was a white solid having a sulfur content of 18.02 percent, as compared to a theoretical content of 18.18 percent.

A portion of the sodium hydroxybutanesulfonate thus prepared (17.6 grams; 0.1 mole) and 25.3 grams (0.1 mole) of α-(2,4-dichlorophenoxy)propionyl chloride was dissolved in 200 milliliters of chlorobenzene and heated at the boiling temperature and under reflux until the evolution of hydrogen chloride of reaction was substantially complete. Upon evaporating the solvent, there was obtained a sodium salt of the sulfobutyl ester of α-(2,4-dichlorophenoxy)propionic acid as a waxy residue. This product has a molecular weight of 393.

Example 8.—Ammonium salt of the 2-sulfoethyl ester of α-(2,4-dichlorophenoxy)propionic acid

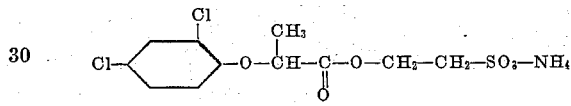

Ethylene oxide was added portionwise to an aqueous solution of ammonium bisulfite at 50° C. to produce an aqueous solution of the ammonium 2-hydroxyethanesulfonate. This product was a white solid having a melting point of 137°–138° C. and a sulfur content of 22.0 percent as compared to the theoretical content of 22.3 percent.

28.6 grams (0.2 mole) of the above prepared ammonium 2-hydroxyethanesulfonate and 50.6 grams (0.2 mole) of α-(2,4-dichlorophenoxy)propionyl chloride were dissolved in 200 milliliters of chlorobenzene and heated at the boiling temperature and under reflux until the evolution of hydrogen chloride of reaction was substantially complete. Upon evaporation of the solvent the desired product was obtained as a solid residue. This solid was recrystallized from ethanol and melted at 176°–178° C. It contained 3.9 percent nitrogen corresponding to the theoretical nitrogen content.

Example 9.—Triethylamine salt of the 2-sulfoethyl ester of α-(2,4-dichlorophenoxy)propionic acid

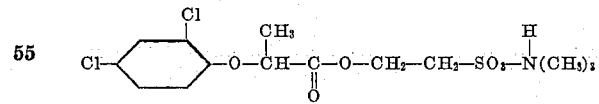

Sulfur dioxide was passed through a stoichiometric quantity of aqueous triethylamine to produce triethylamine bisulfite. Ethylene oxide was then added portionwise to the aqueous solution of the triethylamine bisulfite at a temperature of from 50° to 100° C. to obtain a triethylamine 2-hydroxyethanesulfonate product. This product was a viscous liquid having a refractive index $n/D$ of 1.4705 at 25° C. and a sulfur content of 13.82 percent compared to the calculated value of 14.10 percent.

A solution comprising 0.2 mole (45.4 grams) of the above triethylamine 2-hydroxyethanesulfonate product and 0.2 mole (50.6 grams) of α-(2,4-dichlorophenoxy)propionyl chloride dissolved in 200 milliliters of chlorobenzene was heated at the boiling temperature and under reflux until the evolution of hydrogen chloride of reaction was substantially complete. Upon evaporation of the chlorobenzene the triethylamine salt of the 2-sulfoethyl ester of α-(2,4-dichlorophenoxy)propionic acid was obtained as a viscous liquid residue. This product has a molecular weight of 400.

*Example 10.—Sodium salt of the 2-sulfoethyl ester of α-(2,4-dichlorophenoxy)propionic acid*

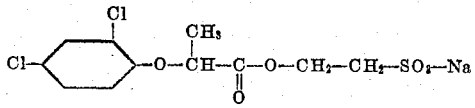

14.8 grams (0.1 mole) of the previously prepared sodium 2-hydroxyethanesulfonate and 25.5 grams (0.1 mole) of α-(2,4-dichlorophenoxy)propionyl chloride were dissolved in 100 milliliters of chlorobenzene. The resulting mixture was heated at 130° C. until the evolution of hydrogen chloride was substantially complete. Upon evaporation of the solvent, there was obtained a sodium salt of the 2-sulfoethyl ester of α-(2,4-dichlorophenoxy)propionic acid as a solid residue. This solid was recrystallized from ethanol and found to melt at 134°–136° C.

*Example 11.—Barium salt of the sulfobutyl ester of α-(2,4-dichlorophenoxy)butyric acid*

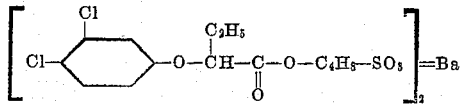

Barium hydroxybutanesulfonate is prepared by the reaction of sulfur dioxide with an aqueous solution of barium hydroxide and subsequent reaction of the resulting barium bisulfite with butylene oxide at 50° to 100° C. One molecular proportion of the barium hydroxybutanesulfonate thus prepared and two molecular proportions of α-(2,4-dichlorophenoxy)butyryl chloride are dissolved in chlorobenzene and heated at the boiling temperature until the evolution of hydrogen chloride is substantially complete. Upon evaporation of the solvent, the desired product is obtained as a residue having a molecular weight of 994.

In a similar manner other salts of sulfoloweralkane esters of haloaryloxy-loweraliphatic monocarboxylic acids may be prepared of which the following are representative:

Potassium salt of the sulfopropyl ester of α-(4-chlorophenoxy)butyric acid by the reaction of α-(4-chlorophenoxy)butyryl chloride and potassium hydroxypropanesulfonate.

Calcium salt of the sulfobutyl ester of α-(2,4,5-trichlorophenoxy)propionic acid by the reaction of calcium hydroxybutanesulfonate and α-(2,4,5-trichlorophenoxy)propionyl chloride.

Methylamine salt of the 2-sulfoethyl ester of α-(2,4-dichlorophenoxy)butyric acid by the reaction of methylamine 2-hydroxyethanesulfonate and α-(2,4-dichlorophenoxy)butyryl chloride.

Ammonium salt of the sulfopropyl ester of α-(2,4,5-trichlorophenoxy)butyric acid by the reaction of ammonium hydroxypropanesulfonate and α-(2,4,5-trichlorophenoxy)butyryl chloride.

Magnesium salt of the sulfobutyl ester of α-(2,4-dichlorophenoxy)propionic acid by the reaction of magnesium hydroxybutanesulfonate and α-(4-chlorophenoxy)propionyl chloride.

Isopropylamine salt of the 2-sulfoethyl ester of 4-chlorophenoxyacetic acid by the reaction of isopropyl amine 2-hydroxyethanesulfonate and 4-chlorophenoxyacetyl chloride.

The new compounds of the present invention have been tested and found to be effective as herbicides and bastericides. For such use the products may be dispersed on an inert finely divided solid and employed as dusts. Such mixtures may also be dispersed in water with the aid of a wetting agent and the resulting aqueous dispersions employed as sprays. The products may likewise be employed as active toxic constituents of oil-in-water emulsions or water dispersions with or without the addition of wetting, dispersing or emulsifying agents. In representative operations, the sodium salt of the 2-sulfoethyl ester of 2,4-dichlorophenoxyacetic acid gives complete inhibition of the growth of *Salmonella typhosa, Staphylococcus aureus, Aspergillus terreus* and *Rhizopus nigricans* in agar culturing media saturated with the ester compound. In other operations the sodium salt of the 2-sulfoethyl ester of 2,4,5-trichlorophenoxyacetic acid gives complete controls of the growth of the germinant seeds and emerging seedlings of wild oats when incorporated in soil at a concentration of about 82 parts by weight per million parts by weight of soil.

We claim:
1. Sodium salt of the sulfopropyl ester of 2,4-dichlorophenoxyacetic acid.
2. Sodium salt of the sulfopropyl ester of 2,4,5-trichlorophenoxyacetic acid.

References Cited in the file of this patent
UNITED STATES PATENTS

| | | |
|---|---|---|
| 2,179,209 | Daimler et al. | Nov. 7, 1939 |
| 2,523,228 | Mullison | Sept. 19, 1950 |
| 2,708,675 | Slagh | May 17, 1955 |
| 2,857,261 | Kosmin | Oct. 21, 1958 |